UNITED STATES PATENT OFFICE.

GEORGE D. BURTON, OF BOSTON, MASSACHUSETTS.

PROCESS OF TREATING CORNSTALKS AND SIMILAR SUBSTANCES.

1,199,241.  Specification of Letters Patent.  Patented Sept. 26, 1916.

No Drawing.  Application filed July 26, 1911.  Serial No. 640,963.

*To all whom it may concern:*

Be it known that I, GEORGE D. BURTON, a citizen of the United States of America, and a resident of Boston, in the county of Suffolk and State of Massachusetts, have invented certain new and useful Improvements in Processes of Treating Cornstalks and Similar Substances, of which the following is a specification.

The object of my invention is to provide a simple, convenient and economical system for the purpose of treating cornstalks, sugar-cane, fibrous shrubs, plants, leaves, etc., for the purpose of preparing the same so that they may be commercially useful in the arts and especially in the making of pulp for paper, cardboard, etc. In addition to the above mentioned substances, many other kinds of porous and fibrous substances may be thus treated equally as well, as, for instance, hemp, straw, jute, ramie, flax, grasses, bark and in fact any substance of a vegetable or fibrous nature.

Another object of my invention is to soften and handle the material or substances above referred to, so that the same may be subjected to further treatment such as will make them commercially useful in the arts.

Another object of my invention is to provide a simple and efficient means whereby my treatment may be economically and safely carried on, which consists in providing a suitable apparatus for carrying out my invention and for washing and bleaching the pulp or treated material. For these purposes I use an apparatus similar to that shown and described in United States Letters Patent #857,027, issued to me June 18, 1907.

I will now describe the operation of my invention relating to the treatment of such material as cornstalks, sugar-cane (bagasse), etc., for the purpose of reducing the same to pulp or a pulpy substance to be used in the manufacture of paper, cardboard, etc., which consists in placing cornstalks or similar materials, in an apparatus substantially like the machine described in the patent referred to herein for the purpose of cleaning, softening, disintegrating, or separating and bleaching the substance of which the stalks or other material is composed, and consists, further, in subjecting such material as stalks, sugar-cane, etc., to a steam pressure varying from the boiling point of the solution containing the material under treatment to a pressure of from two to ten pounds, or less, and agitating, by any well-known means, the solution and material under treatment during the whole or a part of the time the boiling or steaming pressure is being carried on.

The receptacle containing the stalks, etc., may be constructed of any suitable material, and contain a watery solution, to which sufficient caustic soda is added to increase the gravity of said solution to a degree of density varying from 1.005 to 1.020 or less. The receptacle containing the material to be treated may be agitated during the whole or a part of the boiling period for a time varying from sixty to one hundred and twenty minutes, which is sufficient to reduce the stalks, etc., to the conditions required to make them useful for the making of pulp for paper, cardboard, etc. By this manipulation of the stalks, sugar-cane and other substances, I do not carbonize or in any way injure the fibers of the same, and by this method of procedure my process shortens the time, requires a solution of lesser degree in specific gravity and produces a better quality of pulp or material than has heretofore been produced by the longer and more expensive methods.

It has been the usual practice to boil such materials as I have described, for a period varying from four to twelve hours in a solution of caustic soda of about thirty degrees specific gravity under a steam pressure varying from seventy to ninety pounds. Such treatment I have found by experience to be too severe, carbonizing or otherwise injuring the fibers, causing them to become brittle and unfit for the making of good pulp or paper or for other uses.

Long experience of many years devoted to the subject of treating cornstalks, sugar-cane, cotton-stalks, etc., for pulp and paper purposes, has determined the fact that the process herein described is best adapted to the treatment of such materials.

The solution and the substances immersed therein may be subjected to a current of electricity in connection with my process when desired. I have discovered that in shortening the time of treatment and by the use of a low steam pressure and the adoption of a solution of a lesser degree in gravity than heretofore used that my process is less expensive than the methods previously practised, because I save time and labor, and also a saving in the expense of chemicals and steam pressure, and produce a better product for all commercial purposes, avoiding the liability of any injury to the substances under treatment.

The cornstalk is composed of four specific parts, viz: the stalk or shell; the pith within the stalk; the small fibers which run through the pith the whole length of the stalk; the leaves; and the top or tassel of the stalks. In order to make the use of cornstalks a commercial proposition it is necessary to treat the whole stalk at one operation. As the constituent parts of the four elements of the stalk named are different in character it has heretofore been difficult to treat the whole of the stalk in a manner that would produce the same results on all parts of the stalk and have the product uniform. My treatment herein described, enables me to produce a uniform material suitable for pulp and paper from all of the combined parts of the stalks.

I have found that when necessary to make a white paper from cornstalks it is essential to add a bleaching compound to the pulpy material for the purpose of obtaining a good bleaching effect.

I use for a bleaching material about equal parts of dry chlorid of lime and oxalic acid, first dissolving the dry chlorid of lime in water, then adding about the same quantity of dissolved oxalic acid, so that when the chlorid of lime and oxalic acid are combined the solution thus formed may vary in specific gravity from 1.003 to 1.020, more or less, as desired. This bleaching compound produces gases when the two elements above described are combined and causes a rapid bleaching effect upon all vegetable materials when subjected to a solution made as above described.

Having thus described my invention, I claim:

1. The process of treating cornstalks and the like for the purpose of reducing the same to pulp, which consists in placing the stalks in a watery solution, adding thereto sufficient caustic soda to increase the gravity of said solution to a degree of density varying from 1.005 to 1.020, and then boiling the solution at atmospheric pressure and at the same time agitating it.

2. The process of treating cornstalks and the like for the purpose of reducing the same to pulp, which consists in placing the stalks in a watery solution, adding thereto sufficient caustic soda to increase the gravity of said solution to a degree of density varying from 1.005 to 1.020, and then boiling the solution, at the same time agitating it, for a maximum period of from sixty to one hundred and twenty minutes.

3. The process of treating cornstalks and the like for the purpose of reducing the same to pulp, which consists in placing the stalks in a watery solution, adding thereto sufficient caustic soda to increase the gravity of said solution to a degree of density varying from 1.005 to 1.020, then subjecting said solution with the material therein to a steam pressure merely sufficient to bring the solution to the boiling point; and agitating the solution for from sixty to one hundred and twenty minutes while thus subjected to steam pressure.

4. The process of treating cornstalks and the like for the purpose of reducing the same to pulp, which consists in placing the stalks in a suitable treating receptacle containing a mild caustic solution, then subjecting the stalks to a steam pressure sufficient to boil the same for the purpose of disintegrating the parts or fibers thereof and reducing them to a pulpy condition, and then subjecting the pulp to a bleaching compound of an alkali and an acid having a vegetable base, dissolved in water.

5. The process of treating cornstalks which consists in boiling the stalks for a period of not less than sixty nor more than one hundred and twenty minutes in a watery solution containing sufficient caustic soda to bring its density to a point not less than 1.005 and not more than 1.020, and agitating the material during such period.

6. The process of treating cornstalks which consists in boiling the stalks for a period of not less than sixty nor more than one hundred and twenty minutes in a watery solution containing sufficient caustic soda to bring its density to a point not less than 1.005 and not more than 1.020, and agitating the material during such period, and then bleaching the pulpy material by the products of reaction of approximately equal parts of chlorid of lime and oxalic acid in an aqueous solution having a specific gravity from 1.003 to 1.020, approximately.

Signed by me at 4 Post Office Sq., Boston, Mass., this 25th day of July, 1911.

GEO. D. BURTON.

Witnesses:
WALTER E. LOMBARD,
NATHAN C. LOMBARD.